US010422644B2

(12) United States Patent
Clymer et al.

(10) Patent No.: US 10,422,644 B2
(45) Date of Patent: Sep. 24, 2019

(54) METHOD FOR IMPROVING TARGET LOCATION ACCURACY IN A DIRECTION FINDING SYSTEM

(71) Applicant: BAE SYSTEMS INFORMATION AND ELECTRONIC SYSTEMS INTEGRATION INC., Nashua, NH (US)

(72) Inventors: Richard E. Clymer, Concord, NH (US); Jeffrey A. Paul, Milford, NH (US); Dean C. Slocum, Nashua, NH (US)

(73) Assignee: BAE Systems Information and Electronic Systems Integration Inc., Nashua, NH (US)

( * ) Notice: Subject to any disclaimer, the term of this patent is extended or adjusted under 35 U.S.C. 154(b) by 68 days.

(21) Appl. No.: 15/808,246

(22) Filed: Nov. 9, 2017

(65) Prior Publication Data

US 2019/0137277 A1    May 9, 2019

(51) Int. Cl.
*G01C 21/20* (2006.01)
*G01S 5/02* (2010.01)

(52) U.S. Cl.
CPC ............ *G01C 21/20* (2013.01); *G01S 5/0252* (2013.01); *G01S 5/0268* (2013.01)

(58) Field of Classification Search
CPC ...... G01C 21/20; G01S 5/0252; G01S 5/0268

USPC ......................................................... 701/492
See application file for complete search history.

(56) References Cited

U.S. PATENT DOCUMENTS

| 2009/0009397 | A1* | 1/2009 | Taylor | G01C 21/206 342/451 |
| 2014/0159954 | A1* | 6/2014 | Stoddard | G01S 3/023 342/359 |
| 2016/0061932 | A1* | 3/2016 | May | G01S 5/02 342/451 |

* cited by examiner

*Primary Examiner* — Marthe Y Marc-Coleman
(74) *Attorney, Agent, or Firm* — Anthony P. Ng; Russell Ng PLLC

(57) ABSTRACT

A method for improving target location accuracy in direction finding systems is disclosed. A target search region is identified based on a set of received signals, and the target search region is projected onto the earth's surface. An initial search grid, which is smaller than the target search region, is placed within the target search region. Next, the initial search grid is expanded to a full search grid by using an optimum number of virtual grid points in order to cover the entire target search region. The correlation coefficients at the virtual grid points between the estimated phases of emitted signals and the estimated phases of the received signals are then calculated. A target is designated as being at a location associated with the highest correlation coefficient. At this point, a new travel path can be initiated to engage or avoid the target.

13 Claims, 3 Drawing Sheets

METHOD FOR IMPROVING TARGET LOCATION ACCURACY IN A DIRECTION FINDING SYSTEM

STATEMENT OF GOVERNMENT INTEREST

The present invention was made with United States Government support under contract number F33657-99-D-0028 awarded by the Air Force. The United States Government has certain rights in the present invention.

TECHNICAL FIELD

The present disclosure relates to direction finding systems in general, and in particular to a method for improving target location accuracy in direction finding systems.

BACKGROUND

Direction finding (DF) is the process of obtaining the direction of arrival bearings of radio-frequency (RF) emitters of interest. Geolocation (GEO) is the process of determining the locations of RF emitters of interest based on DF estimates. DF and GEO are commonly utilized to identify, track and geolocate various sources of RF transmissions.

DF and GEO techniques for identifying and locating RF emitters are usually based on energy/amplitude comparison, interferometric, time-of-arrival (TOA), time-difference-of-arrival (TDOA) and other antenna null-steering approaches. These approaches typically require special antennas, close-tolerance amplitude/phase RF receiver components, enhanced receiver dynamic range and expanded processing bandwidth.

In general, a DF/GEO system collects RF signals from a source RF emitter by using an array of spatially displaced antennas. Nearly all DF algorithms require that signals received by the antennas are routed to multiple signal processors synchronously. These signal processors are then utilized to compare the amplitude/energy, phase and TOA/TDOA from the received signals in order to derive the location of the source RF emitter.

The combination of various DF and GEO techniques forms the basis of many complex DF systems. The present disclosure provides a method for improving target location accuracy in a DF system.

SUMMARY

In accordance with one embodiment, a target search region is identified based on a set of received signals, and the target search region is projected onto the earth's surface. An initial search grid, which is smaller than the target search region, is placed within the target search region. Next, the initial search grid is expanded to a full search grid by using an optimum number of virtual grid points in order to cover the entire target search region. The correlation coefficients at the virtual grid points between the estimated phases of emitted signals and the estimated phases of the received signals are then calculated. A target is designated as being at a location associated with the highest correlation coefficient. At this point, a new travel path can be initiated to engage or avoid the target.

The features and advantages described herein are not all-inclusive and, in particular, many additional features and advantages will be apparent to one of ordinary skill in the art+in view of the drawings, specification and claims. Moreover, it should be noted that the language used in the specification has been selected principally for readability and instructional purposes and not to limit the scope of the inventive subject matter.

BRIEF DESCRIPTION OF THE DRAWINGS

The invention itself, as well as its modes of use, further objects, and advantages thereof, will best be understood by reference to the following detailed description of an illustrative embodiment when read in conjunction with the accompanying drawings, wherein.

DETAILED DESCRIPTION

Figure 1:
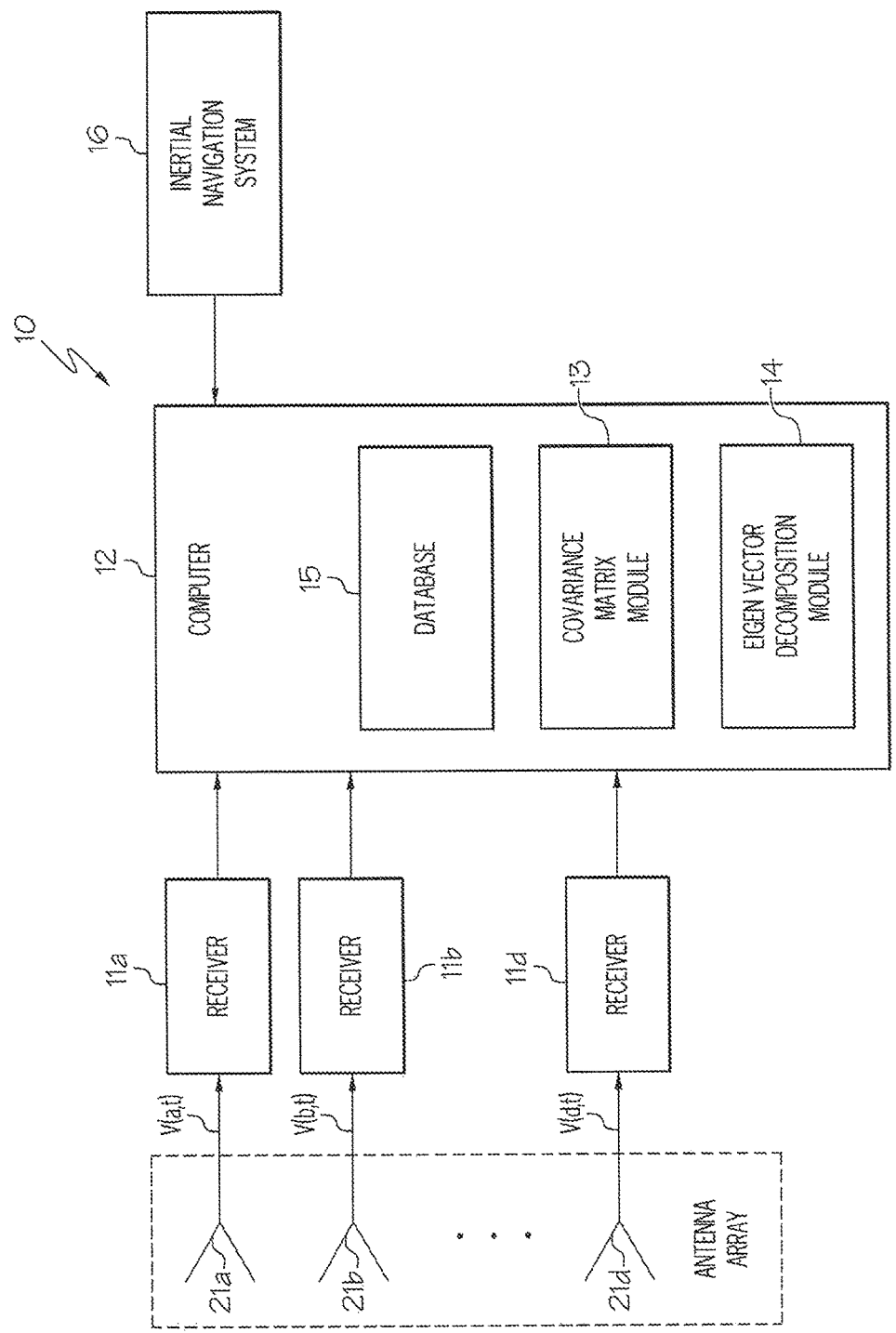
FIG. 1 is a block diagram of a direction finding/geolocation system, in accordance with one embodiment.

Referring now to the drawings and in particular to FIG. 1, there is illustrated a block diagram of a direction finding (DF) system for providing Correlation Interferometry Geo-Location (CIGL) information on radio-frequency (RF) emitters, in accordance with one embodiment of the present disclosure. As shown, a DF system 10 includes multiple receivers 11a-11d that are connected to antenna elements 21a-21d of an antenna array, respectively. DF system 10 also includes a signal processing computer 12 and an inertial navigation system 16.

During operation, an electromagnetic signal E(t) arrives at each of antenna elements 21a-21d at different times as determined by its angle of incidence $\theta^i$, $\varphi^j$ with respect to the spacing of antenna elements 21a-21d. The incident angle is detected as a change in phase of the electromagnetic wave as it moves across antenna elements 21a-21d. Each of voltages V(a,t)-V(d,t) output respectfully from antenna elements 21a-21d denotes a complex waveform that is output from each of antenna elements 21a-21d, and is the only quantity that conveys information. In other words, each of voltages V(a,t)-V(d,t) represents the complex envelope of the output of one of antenna elements 21a-21d, and represents the signal of interest and an associated noise component.

The complex voltages V(a,t)-V(d,t) can be represented by the following equation:

$$V(n,t)=E(t)A_r[n\theta^i,\varphi^j]+\eta(n,t)$$

where n is one of antenna elements 21a-21d. $A_r[n,\theta^i,\varphi^j]$ is an antenna response vector in which ($\theta^i$, $\varphi^j$) defines the azimuth $\theta^i$ and elevation $\varphi^j$ of the received signals, and $\eta(n,t)$ is a noise component of received signals.

The outputs from receivers 11a-11d, in a digitized format, are sent to signal processing computer 12 having multiple processors (not shown) that can process the received signals synchronously. Signal processing computer 12 includes, for example, covariance matrix module 13, an Eigen vector decomposition module 14 and an antenna response database 15. Covariance matrix module 13 measures and processes the digitized signal samples from receivers 11a-11d into individual measurement covariance matrices that are then sent to Eigen vector decomposition module 14. Covariance matrix module 13 and Eigen vector decomposition module 14 can be implemented as software and/or hardware modules located within or separate from signal processing computer 12. Antenna response database 15 contains a set of theoretical phases that were previously collected. Each element in antenna response database 15 corresponds to a discrete azimuth and depression angle of a theoretical RF emitter in reference to a phase center on an aircraft from which measurements are performed. The position and attitude information of the aircraft are provided by inertial navigation system 16, and such information are fed to signal processing computer 12. With the above-mentioned information, DF system 10 can provide a geographical position of a source RF emitter.

Figure 2:
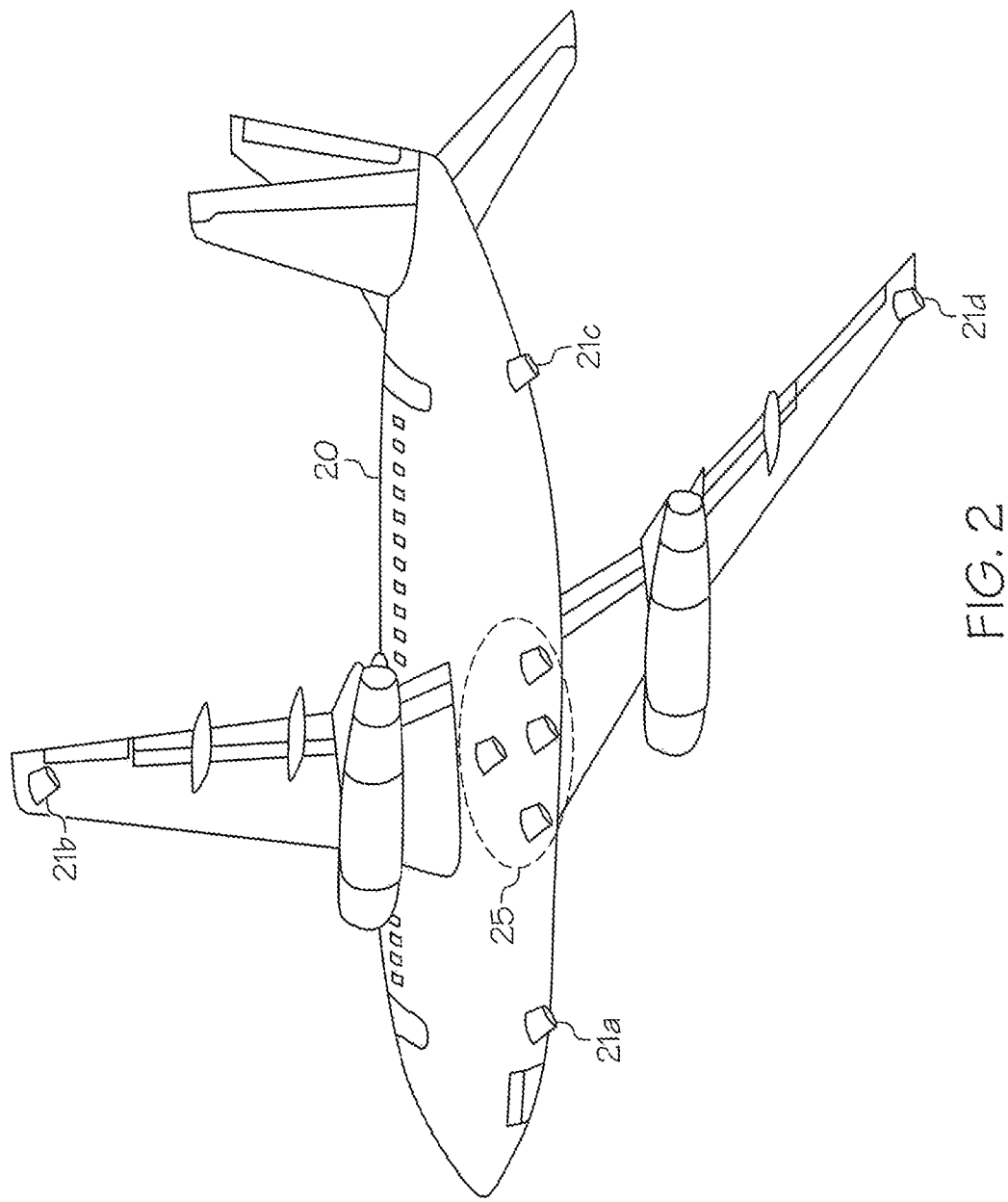
FIG. 2 shows an aircraft equipped with a direction finding antenna array to be utilized by the direction finding/geolocation system of FIG. 1.

Antenna elements 21a-21d in one embodiment can be mounted on an aircraft, such as a plane, helicopter, or unmanned aerial vehicle (UAV). With reference now to FIG. 2, there is illustrated an aircraft 20 equipped with a DF antenna array having individual antenna elements 21a-21d, according to one embodiment of the present disclosure. In particular, antenna elements 21a and 21c in one example are mounted on the front and rear of the fuselage of aircraft 20, respectively, and antenna elements 21b and 21d are mounted near the ends of the wings of aircraft 20, respectively. Antenna elements 21a-21d are shown as blade antenna elements in FIG. 1, but for many applications, blade antenna elements can be replaced by broadband spiral antenna elements that are receptive to both horizontally and vertically polarized signals. The spacing of antenna elements 21a-21d provides a relatively large antenna aperture to facilitate the provisioning of accurate CIGL solutions. The selection of antenna elements 21a-21d and their physical arrangement on aircraft 20 depend on the frequencies to be received and their polarization. More than one set of DF antenna arrays can be mounted on aircraft 20 in order to cover different frequency bands and signal polarizations.

Aircraft 20 also includes an array of airborne DF antenna elements 25. In order to achieve high DF accuracy, DF antenna elements 25 are spaced as far as possible from each other, but to minimize ambiguities, there must be a sufficient number of antenna elements 25 and they cannot be too far apart. These constraints typically compel the array of antenna elements 25 to a small area near the center of the fuselage.

Figure 3:
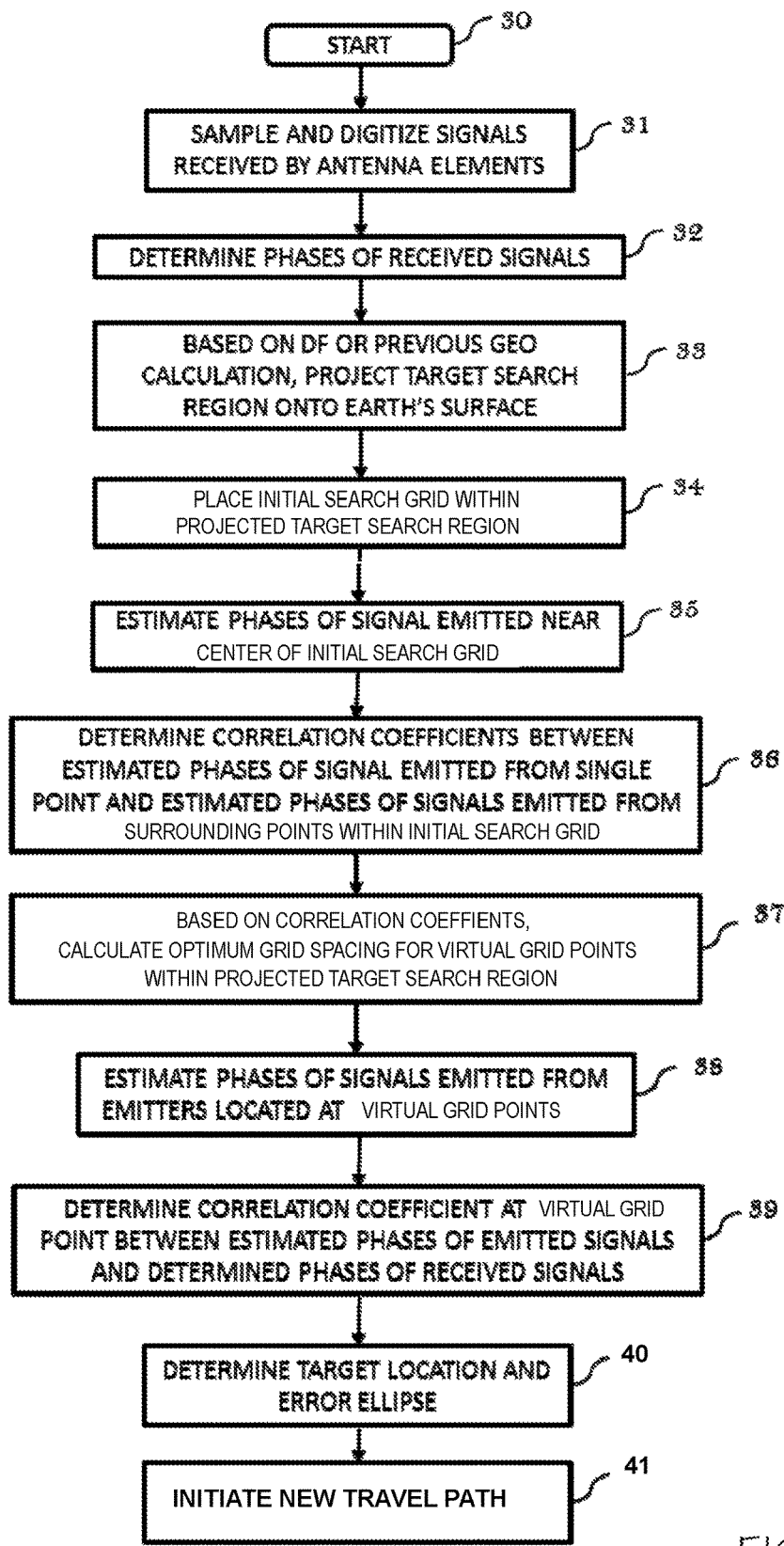
FIG. 3 is a flow diagram of a method for improving smart grid in the direction finding/geolocation system of FIG. 1.

Referring now to FIG. 3, there is illustrated a flow diagram of a method for improving target location accuracy in DF and geo-location systems, such as DF system 10 from FIG. 1, according to one embodiment of the present disclosure. Starting at block 30, signals received by antenna elements 21a-21d are sampled and digitized, as shown in block 31. For example, once a second for multiple consecutive seconds, the signals received by antenna elements 21a-21d are sampled and digitized as pulses become available to DF system 10. The signals received by antenna elements 21a-21d are stored as complex data. The pulse collection rate depends upon the transmit characteristics (such as number of pulses) of a source RF emitter. The phases of the digitized signals are determined, as depicted in block 32, and the digitized signals are subsequently converted into individual phase measurements.

Based on the received signals, a target search region is then identified by using, for example, DF calculations, and azimuth and elevation spans of the target search region are then projected onto the earth's surface as the projected target search region, as shown in block 33.

Next, a search grid having multiple grid points is overlaid on the projected target search region, as depicted in block 34. The search grid is preferably located in the center of the projected target search region. In addition, the size of the search grid is substantially smaller than the projected target search region in order to allow for faster computation.

Phases of signals emitted from a theoretical emitter point near the center of the search grid are estimated. In addition, phases of signals from the search grid points located around the theoretical emitter point are also estimated, as shown in block 35.

A set of correlation coefficients between the estimated phases of signals emitted from emitters located at each of the grid points on the search grid and the estimated phases of the theoretical emitter point near the center of the search grid are determined, as depicted in block 36. The correlation coefficients represent a level of similarity between the estimated phases of the signals emitted from the sample grid points and the estimated phases of the theoretical emitter near the center of the target search region. Since the signal phase responses are stored as complex data having a real component and an imaginary component, the correlation coefficients can be determined by performing a matched filter (such as dot product) operation on the complex data. Basically, matched filtering measures the degree of similarity between two signal vectors, and the degree of similarity is expressed in terms of correlation coefficients.

The above-mentioned calculated correlation coefficients are then utilized to generate an optimum number of virtual grid points and spacing between virtual grid points to cover the entire projected target search region in order to find the target (i.e., a source RF emitter), as shown in block 37. The details of calculating the optimum number of virtual grid points and spacing between virtual grid points are described below. In conjunction, a peak correlation pattern can be generated to visualize how densely the virtual grid points are populated within the projected target region.

After the projected target search region has been covered with virtual grid points, the phases of signals emitted from the emitters located at all the virtual grid points are then estimated, as depicted in block 38.

Next, the correlation coefficients between the estimated phase of the signals emitted from theoretical emitters located at each of the virtual grid points and the previously determined or estimated phase of the corresponding received signals (obtained from block 32) are calculated, as shown in block 39.

The correlation coefficients can range from 0.0 to 1.0, with 1.0 being the perfect correlation coefficient. Under ideal conditions of high signal-to-noise ratio and no platform error, antenna error and/or atmospheric propagation error, a nearly perfect correlation coefficient of 1.0 at a search grid location near the location of the source RF emitter can be achieved.

The correlation coefficients associated with each of the virtual grid points is searched for the highest value. The virtual grid point location with the highest correlation coefficient is the estimated target location and the width of the peak pattern of the correlation coefficients around the estimated target location determines an error ellipse that surrounds the target location, as shown in block 40.

The precision of locating the source RF emitter can be improved by iterating the geolocation method of FIG. 3. If iterations of the geolocation method of FIG. 3 need to be performed, the grid point having the highest correlation coefficient is utilized as the locus for subsequent passes through the geolocation method of FIG. 3. During each pass, the area around the peak is analyzed with increasing spatial resolution giving a refined estimate of the source RF emitter's position on the ground. The position estimate is iteratively refined until a pre-specified resolution tolerance has been attained. The refined location can be passed by the DF system onto other higher level system for further analysis.

At this point, the target is resolved to be located within the error ellipse. In response, a new travel path can be initiated for aircraft or vehicles to engage or avoid the target, as depicted in block 41.

Calculate an Optimum Number of Virtual Grid Points and Spacing Between Virtual Grid Points The full search grid can be filled with an optimum number of grid points by using the following steps:

i. Generate "cross-hair" set of points: Use pre-defined, algorithm specific equations to generate a tightly spaced set of virtual grid points, generating a "cross-hair" pattern of points in the center of the projected target search region.

ii. Generate expectation voltages associated with the cross-hair points: Using the flight and measurement parameters associate with the geolocation collection, generate hypothetical measurement voltages that would be expected (expectation voltages) from ground targets if they were located at the cross-hair points.

iii. Correlate the cross-hair expectation voltages with the expectation voltages for the center point. This will produce a correlation of 1.0 at the center point and the correlation will roll off as the points move away from the center.

iv. Use the correlation beam width in azimuth and down range, as calculated in iii. above, to determine the grid spacing in azimuth and down range at the range of the search grid center point.

v. Scale the azimuth and down range spacing proportional to the slant range to the points in the full search grid. The virtual grid points follow variable azimuth "rows" of constant slant range, and range variable "columns" of constant azimuth.

A. Cross Hair Sampling

A central point within the search region is selected from which a "cross-hair" of data points are generated. An auto-correlation is calculated at the central point, using the geolocation algorithm of choice, and all the measurement related parameters associated with the collection for the current geo solution. The auto-correlation at the central point should be 1.0 in that the hypothetical "measurements" and the expectation or calibration voltages are both theoretically generated and by definition the same. The "cross-hairs" are generated by choosing sample points in cross-range and down-range.

The cross-hair grid points are generated conservatively in order to have an adequate number of points to characterize the hypothetical correlation peak. The center of the search region is established and is the location of the first point. Since the hypothetical correlation peak beam width is essentially symmetric in azimuth, only one side of the cross-hair sample points is needed to determine half of the azimuth correlation beam width. In down range, the correlation beam width tends to roll off more quickly toward the aircraft. Since under sampling, the beam width is undesired, the sample points from the center point moving closer to the aircraft should be used to determine half of the down range correlation beam width. A conservative estimate in the calculation of the number of cross-hair sampling points is to have at least 3 points (2 spacings) across the estimated beam width at the frequency of interest, using the longest possible projected array length. It is also desired to have points covering at least 15 beam widths in one direction for when the processed beam width is broader than the estimate. This results in 31 azimuthal half cross-hair sampling points and 31 down range cross-hair sampling points.

B. Cross-Hair Azimuth Points

The azimuth correlation beam width is calculated as follows:

$$\text{XHair\_Az\_BW}(\% \text{ Range}) = k_{Az} \cdot \left(\frac{\lambda}{L}\right)$$

where $k_{Az}$=constant
$\lambda$=wavelength for the frequency of the collection, (11.811/frequency)
L=maximum array length For the cross-hair azimuth points, the spacing should be such that there are 3 points, or 2 spaces over the XHair_Az_BW(%Range). This implies that the spacing should be: ((XHair_AZ_BW(%Range))/2). Using this spacing and starting from the center point, points should be spread out over an azimuth span of 15·XHair_Az_BW(%Range).

C. Cross-Hair Down Range Points

The down range correlation beam width is dependent on the fraction of the slant range to the center point that the aircraft has flown during the collection. The Cross-Hair Down Range beam width in percent of range to the emitter is shown as $$\text{XHair\_Az\_BW}(\% \text{ Range}) = k_{DR} \cdot \left(\frac{\lambda}{L \cdot \text{fract\_range\_flown}}\right)$$

where fract_range_flown=fraction of the slant range to the emitter (center point) that the aircraft has flown during the collection.

For the cross-hair down range points, the spacing should be such that there are 3 points, or 2 spaces over the XHair_DR_BW(%Range). This implies that the spacing should be: ((XHair_DR_BW(%Range))/2). Using this spacing and starting from the center point, points should be spread out over an azimuth span of 15·XHair_DR_BW (%Range).

D. Calculation of Flight Parameter Based Correlation Half Beam Width

Using the cross-hair grid points determined above, calculate the flight parameter based correlation values at each grid point. Determine the azimuthal correlation ½ beam width by moving from the center point azimuthally to the point where the correlation value drops below 0.7 (correlation squared drops below 0.5). The percent range distance from the center point to the point where the correlation drops below 0.7 is the azimuthal correlation ½ beam width. Similarly, determine the down range correlation ½ beam width by moving from the center point along the down range axis to the point where the correlation value drops below 0.7 (correlation squared drops below 0.5). The percent range distance from the center point to the point where the correlation drops below 0.7 is the down range correlation ½ beam width. If the correlation value never drops below 0.7, the end point (i.e., point farthest from center) is used for the correlation ½ beam width.

E. Fill Search Region with Grid Points

It is desired to have three grid points over the correlation ½ beam width within the search grid, or to have spacings such there are two over the correlation ½ beam width.

F. Azimuthal Grid Points

Starting from the search region center point, fill the grid in cross range, or azimuth, with a spacing of 0.5·(azimuthal correlation ½ beam width). The spacing of the azimuth points for a given slant range gets tighter as the slant range gets closer and expands as the slant range gets farther from the aircraft, such that there is always the same number of azimuth grid points at any slant range in the search wedge. The search wedge width in azimuth varies proportionally with slant range, such that the "wedge" does not come to a point under the aircraft, but has a width proportional to the altitude of the aircraft above the ground.

G. Down Range Grid Points

Starting from the search region center point, fill the grid along the down range axis with a spacing of 0.5·(down range correlation ½ beam width) at the center. The spacing gets tighter as the range gets closer and expands as the range gets farther from the aircraft, proportional to the ratio of the range. For example, down range spacing=0.5*(down range correlation ½ beam width at center)*(slant range to grid point)/(slant range to center).

As has been described, the present invention provides a method for improving target location accuracy in DF and geolocation systems. Those skilled in the art will appreciate that the mechanisms of the present invention are capable of being distributed as a program product in a variety of recordable type media such as compact discs and digital video discs.

While the invention has been particularly shown and described with reference to a preferred embodiment, it will be understood by those skilled in the art that various changes in form and detail may be made therein without departing from the spirit and scope of the invention.

What is claimed is:

1. A method for improving target location accuracy in direction finding and geo-location systems, said method comprising:
    identifying a target search region based on a set of received signals emitted by a source emitter located on Earth;
    projecting said target search region onto Earth's surface;
    placing an initial search grid within said projected target search region, wherein said initial search grid is smaller than said projected target search region;
    expanding said initial search grid to a full search grid to cover said projected target search region by using an optimum number of virtual grid points;
    determining correlation coefficients at said virtual grid points between estimated phases of emitted signals and estimated phases of said received signals;
    designating a target as being at a location associated with the highest correlation coefficient; and
    avoiding said target in travel path.

2. The method of claim 1, wherein said identifying further includes identifying said target search region by utilizing said estimated phases of said received signals.

3. The method of claim 1, wherein said initial search grid is located near a center of said target search region.

4. The method of claim 1, wherein said optimum number of virtual grid points is determined by
    estimating phases of signals emitted from a single theoretical emitter point located near a center of said initial search grid, and from other grid points of said initial search grid;
    determining correlation coefficients between said estimated phases of signals emitted from said single theoretical emitter point and from said other grid points of said initial search grid; and
    determining spacings of virtual grid points within said full search grid based on said determined correlation coefficient to obtain said optimum number of virtual grid points.

5. The method of claim 4, wherein said method further includes generating a peak correlation pattern about said single theoretical emitter point.

6. The method of claim 1, wherein one of said correlation coefficients reflects a level of similarity between said single point and said grid points surrounding said single point.

7. A non-transitory computer-recordable medium having computer program product for improving geolocation in a direction finding system, said computer program product comprising:
    program code for identifying a target search region based on a set of received signals emitted by a source emitter located on Earth;
    program code for projecting said target search region onto Earth's surface;
    program code for placing an initial search grid within said projected target search region, wherein said initial search grid is smaller than said projected target search region;
    program code for expanding said initial search grid to a full search grid to cover said projected target search region by using an optimum number of virtual grid points;
    program code for determining correlation coefficients at said virtual grid points between estimated phases of emitted signals and estimated phases of said received signals;
    program code for designating a target as being at a location associated with the highest correlation coefficient; and
    program code for avoiding said target in travel path.

8. The non-transitory computer program product of claim 7, wherein said program code for identifying further includes program code for identifying said target search region by utilizing said estimated phases of said received signals.

9. The non-transitory computer program product of claim 7, wherein said initial search grid is located near a center of said target search region.

10. The non-transitory computer program product of claim 7, wherein said optimum number of virtual grid points is determined by
    program code for estimating phases of signals emitted from a single theoretical emitter point located near a center of said initial search grid, and from other grid points of said initial search grid;
    program code for determining correlation coefficients between said estimated phases of signals emitted from said single theoretical emitter point and from said other grid points of said initial search grid; and
    program code for determining spacings of virtual grid points within said full search grid based on said determined correlation coefficient to obtain said optimum number of virtual grid points.

11. The non-transitory computer program product of claim 10, wherein said computer program product further includes program code for generating a peak correlation pattern about said single theoretical emitter point.

12. The non-transitory computer program product of claim 7, wherein one of said correlation coefficients reflects a level of similarity between said single point and said grid points surrounding said single point.

13. A direction finding system, comprising:
    a plurality of antenna elements for receiving signals; and
    a signal processing device for
        identifying a target search region based on a set of received signals emitted by a source emitter located on Earth;
        projecting said target search region onto Earth's surface;
        placing an initial search grid within said projected target search region, wherein said initial search grid is smaller than said projected target search region;
        expanding said initial search grid to a full search grid to cover said projected target search region by using an optimum number of virtual grid points;

determining correlation coefficients at said virtual grid points between estimated phases of emitted signals and estimated phases of said received signals;
designating a target as being at a location associated with the highest correlation coefficient; and
avoiding said target in travel path.

\* \* \* \* \*